(12) United States Patent
Huizenga (10) Patent No.: US 12,286,593 B2
(45) Date of Patent: Apr. 29, 2025

(54) FLUIDIZED BED REACTOR AND ASSOCIATED HYDROPYROLYSIS PROCESSES

(71) Applicant: SHELL OIL COMPANY, Houston, TX (US)

(72) Inventor: Pieter Huizenga, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 135 days.

(21) Appl. No.: 18/254,614

(22) PCT Filed: Dec. 17, 2021

(86) PCT No.: PCT/US2021/064050
§ 371 (c)(1),
(2) Date: May 26, 2023

(87) PCT Pub. No.: WO2022/133224
PCT Pub. Date: Jun. 23, 2022

(65) Prior Publication Data
US 2024/0018419 A1    Jan. 18, 2024

(30) Foreign Application Priority Data
Dec. 18, 2020 (EP) ..................... 20215260

(51) Int. Cl.
*C10G 3/00* (2006.01)
*B01J 8/24* (2006.01)

(52) U.S. Cl.
CPC .................. *C10G 3/50* (2013.01); *B01J 8/24* (2013.01); *C10G 3/42* (2013.01);
(Continued)

(58) Field of Classification Search
CPC .... C10G 3/50; C10G 3/42; C10G 2300/1003; C10G 2300/1014; C10G 1/08; C10G 3/57;
(Continued)

(56) References Cited

U.S. PATENT DOCUMENTS 8,057,641 B2 * 11/2011 Bartek .................... C10B 49/22
208/126
8,492,600 B2    7/2013 Marker et al.
(Continued)

OTHER PUBLICATIONS

International Search Report and Written Opinion Received for PCT Patent Application No. PCT/US2021/064050, Mailed on Feb. 8, 2022, 11 Pages.

*Primary Examiner* — Ali Z Fadhel
(74) *Attorney, Agent, or Firm* — SHELL USA, INC.

(57) ABSTRACT

A process includes a.) supplying a biomass feedstock, a fluidizing gas having hydrogen, and a catalyst recirculation stream having deoxygenating catalyst to a mixing zone of a fluidized bed reactor; b.) allowing the biomass feedstock, the fluidizing gas and the deoxygenating catalyst to move upwards through the fluidized bed reactor from the mixing zone to a bulk reactor zone; c.) allowing the biomass feedstock to contact the deoxygenating catalyst in the presence of the fluidizing gas in the bulk reactor zone of the fluidized bed reactor to produce a hydropyrolysis reactor output including at least one non-condensable gas, a partially deoxygenated hydropyrolysis product and char; and d.) withdrawing at least a portion of the deoxygenating catalyst from the bulk reactor zone to form the catalyst recirculation stream that is supplied to the mixing zone in step a).

17 Claims, 2 Drawing Sheets

(52) U.S. Cl.
CPC ............ *B01J 2208/00849* (2013.01); *C10G 2300/1003* (2013.01); *C10G 2300/1014* (2013.01)

(58) Field of Classification Search
CPC .. C10G 11/18; C10G 69/04; B01J 8/24; B01J 2208/00849; B01J 6/008; B01J 8/1827; B01J 8/1845; B01J 8/1854; Y02P 30/20
See application file for complete search history.

(56) References Cited

U.S. PATENT DOCUMENTS

| | | |
|---|---|---|
| 8,841,495 B2 | 9/2014 | Marker et al. |
| 9,944,837 B2 * | 4/2018 | Yanik ........................ C10G 1/08 |
| 10,822,546 B2 | 11/2020 | Urade et al. |
| 2016/0002540 A1 | 1/2016 | Felix et al. |
| 2017/0130134 A1 | 5/2017 | Urade et al. |

* cited by examiner

FLUIDIZED BED REACTOR AND ASSOCIATED HYDROPYROLYSIS PROCESSES

CROSS REFERENCE TO RELATED APPLICATIONS

This is a National stage application of International Application No. PCT/US2021/064050, filed Dec. 17, 2021, which claims priority of European Application No. 20215260.9, filed Dec. 18, 2020 which is incorporated herein by reference in its entirety.

The present disclosure generally relates to hydropyrolysis processes and fluidized bed reactors for converting a biomass feedstock into a liquid hydrocarbon material suitable for use as a fuel or as a blending component in a fuel.

BACKGROUND OF THE DISCLOSURE

With increasing demand for liquid transportation fuels, decreasing reserves of "easy oil" (crude petroleum oil that can be accessed and recovered easily) and increasing constraints on the carbon footprints of such fuels, it is becoming increasingly important to develop routes to produce liquid transportation fuels from alternative sources in an efficient manner.

Biomass offers a source of renewable carbon and refers to biological material derived from living or deceased organisms and includes lignocellulosic materials (e.g., wood), aquatic materials (e.g., algae, aquatic plants, and seaweed) and animal by-products and wastes (e.g., offal, fats, and sewage sludge). Liquid transportation fuels produced from biomass are sometimes referred to as biofuels. Therefore, when using such biofuels, it may be possible to achieve more sustainable $CO_2$ emissions compared with petroleum-derived fuels.

However, in the conventional pyrolysis of biomass, typically fast pyrolysis carried out in an inert atmosphere, a dense, acidic, reactive, liquid bio-oil product is obtained. This product contains water, oils and char formed during the process. The use of bio-oils produced via conventional pyrolysis is, therefore, subject to several drawbacks. These include increased chemical reactivity, water miscibility, high oxygen content and low heating value of the product. Often these products can be difficult to upgrade to fungible liquid hydrocarbon fuels.

More recently, the use of hydrogen in biomass pyrolysis (i.e. hydropyrolysis) has been disclosed. For example, hydropyrolysis processes such as those described in U.S. Pat. No. 8,492,600 have been found to overcome a number of the drawbacks of conventional fast pyrolysis processes, including those described above.

Hydropyrolysis of a biomass feedstock may be carried out in a reactor vessel containing a fluidized bed. Fluidized beds generally include solid particles, such as catalyst, which are agitated and fluidized by a stream of gas, which travels upward through the bed and exits from the bed at or near the top of the reactor.

However, it has now been recognized that conventional fluidized bed reactors may suffer from a variety of drawbacks when used for the hydropyrolysis of a biomass feedstock on a commercial scale. For example, when operating on a commercial scale, temperature control within the reactor is a primary concern due to the minimum temperature required at the reactor inlet versus the maximum temperature allowable at the reactor outlet. That is to say, the reactor inlet temperature generally needs to be maintained above a certain minimum temperature to prevent operability issues within the reactor (e.g. formation of sticky materials) and to obtain a suitable commercial yield of the desired resulting product, while the reactor outlet temperature needs to be maintained below a certain maximum temperature for catalyst stability and suitable yield of the desired resulting product. However, when operating a conventional fluidized bed reactor such that the minimum reactor inlet temperature is satisfied, the heat generated by the exothermic hydrodeoxygenation reaction occurring inside the reactor generally causes the reactor outlet temperature to far exceed the maximum allowable temperature unless excessive use of quench gas or ballast gas is applied, both of which are economically undesirable.

Another concern when utilizing a conventional fluidized bed reactor for the hydropyrolysis of a biomass feedstock relates to adequate heating and dispersion of the biomass feedstock within the fluidized bed reactor. More specifically, when a biomass feedstock is supplied to an inlet of a fluidized bed reactor, it is important for the biomass to be both rapidly heated and dispersed in the catalyst present in the fluidized bed. If not, the rate of pyrolysis may become too low and consequently, yield of the desired resulting products is reduced. Further, in the worst case, there is a possibility of operability issues due to the formation of sticky materials within the reactor. However, conventional fluidized bed reactors do not provide the ability to manipulate the mixing and dispersion of the biomass feedstock in the event that such mixing and dispersion is inadequate.

SUMMARY

The present disclosure provides a process comprising:
a) supplying a biomass feedstock, a fluidizing gas comprising hydrogen, and a catalyst recirculation stream comprising deoxygenating catalyst to a mixing zone of a fluidized bed reactor;
b) allowing the biomass feedstock, the fluidizing gas and the deoxygenating catalyst to move upwards through the fluidized bed reactor from the mixing zone to a bulk reactor zone;
c) allowing the biomass feedstock to contact the deoxygenating catalyst in the presence of the fluidizing gas in the bulk reactor zone of the fluidized bed reactor to produce a hydropyrolysis reactor output comprising at least one non-condensable gas, a partially deoxygenated hydropyrolysis product and char; and
d) withdrawing at least a portion of the deoxygenating catalyst from the bulk reactor zone to form the catalyst recirculation stream that is supplied to the mixing zone in step a).

Also provided is a fluidized bed reactor comprising:
a mixing zone, a bulk reactor zone, one or more downcomers fluidly connecting the mixing zone and the bulk reactor zone, and an outlet at the top of the fluidized bed reactor configured to produce a hydropyrolysis reactor output comprising at least one non-condensable gas, a partially deoxygenated hydropyrolysis product and char,
wherein the mixing zone comprises: one or more inlets that are fluidly connected to a source of a biomass feedstock; one or more inlets that are fluidly connected to a source of a fluidizing gas; and one or more inlets for one or more outlets of the one or more downcomers fluidly connecting the mixing zone and the bulk reactor zone; and wherein the bulk reactor zone is positioned above the mixing zone.

BRIEF DESCRIPTION OF THE DRAWINGS

Advantages of the disclosure may become apparent upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Described herein are hydropyrolysis processes and fluidized bed reactors for converting a biomass feedstock into a liquid hydrocarbon material suitable for use as a fuel or as a blending component in a fuel. By utilizing the hydropyrolysis processes and fluidized bed reactors disclosed herein, it is possible to maintain both a suitable minimum temperature at a reactor inlet, while simultaneously not exceeding a maximum temperature at a reactor outlet. Additionally, the processes and reactors disclosed herein provide the advantage that a biomass feedstock supplied to a reactor inlet is both rapidly heated and dispersed in catalyst present in the fluidized bed reactor.

More specifically, the fluidized bed reactors of the present disclosure use one or more downcomers to supply a hot catalyst recirculation stream from a bulk reactor zone located at or near the top of the reactor to a mixing zone located at or near the bottom of the reactor. In this manner, it is possible to withdraw hot catalyst from a bulk reactor zone located at or near the top of the reactor and transfer it to a mixing zone located at or near the bottom of the reactor, thereby enabling more efficient axial heat transfer throughout the reactor, and consequently being able to stay within the temperature bounds that are intrinsic to the process chemistry. Furthermore, by introducing a catalyst recirculation stream and a biomass feedstock to a mixing zone at or near the bottom of the reactor, the biomass feedstock is able to be rapidly heated as the hot catalyst recirculation stream is brought into contact with the biomass, and more adequately dispersed in the deoxygenating catalyst, thereby facilitating the hydropyrolysis process.

As described herein, a hydropyrolysis process generally includes supplying a biomass feedstock and fluidizing gas including hydrogen to a fluidized bed reactor including a deoxygenating catalyst that is operating at an elevated temperature and pressure. The term "hydropyrolysis" is used generally to refer to a process by which a biomass feedstock is rapidly heated and thermally decomposed, in the presence of solid catalyst particles in an atmosphere consisting largely of hydrogen gas. The hydropyrolysis process provides a means to remove oxygen from biomass and other feedstocks containing significant quantities of carbon and chemically-bonded oxygen to produce light hydrocarbons products with a large portion of the oxygen removed from the feedstock-derived liquid. A representative hydropyrolysis process has been described in detail in, among others, U.S. Pat. Nos. 8,492,600 and 8,841,495, the relevant disclosure of which is hereby incorporated by reference.

A fluidized bed reactor of the present disclosure generally includes a mixing zone, a bulk reactor zone and optionally, an expanded solids disengagement zone (i.e., a section of expanded reactor diameter or cross-sectional area, relative to the diameter or cross-sectional area of the fluidized bed) at a suitable height above the bulk reactor zone in order to promote the separation of solid char particles from solid catalyst particles. The fluidized bed reactor further includes one or more downcomers fluidly connecting the bulk reactor zone located at or near the top of the reactor to the mixing zone located at or near the bottom part of the reactor.

As used herein, the term "mixing zone" is used to describe a region located at or near the bottom of a fluidized bed reactor wherein mixing of a biomass feedstock, a deoxygenating catalyst and a fluidizing gas including hydrogen takes place. In accordance with the present disclosure, a biomass feedstock and a fluidizing gas are supplied to the mixing zone of the fluidized bed reactor via one or more inlets, preferably located at or near the bottom of the reactor. Additionally, a catalyst recirculation stream including a deoxygenating catalyst is supplied to the mixing zone via one or more downcomers, which are in fluid communication with a bulk reactor zone located at or near the top of the fluidized reactor bed such that the catalyst recirculation stream is withdrawn from the bulk reactor zone and supplied to the mixing zone via the one or more downcomers. Preferably, the biomass feedstock is supplied to the mixing zone at a point that is above the inlet for the catalyst recirculation stream, so that the biomass feedstock is rapidly heated from ambient temperature to the temperature of the catalyst recirculation stream through mixing. In addition, the catalyst recirculation stream is preferably allowed to thermally equilibrate with the fluidizing gas before coming into contact with the biomass feedstock to enable the fastest possible heat transfer.

The mixing zone generally includes one or more cylindrical vessels, for example from one to five. The biomass feedstock, the fluidized gas and the catalyst recirculation stream may each be introduced to the one or more cylindrical vessels in the mixing zone via one or more (for example from one to ten) inlet locations, which may correspond to different axial heights within the mixing zone. In one embodiment, the biomass feedstock may be supplied to the mixing zone via more than one inlet location at different axial heights. Preferably, in the mixing zone, an inlet for the biomass feedstock is located above an inlet for the catalyst recirculation stream and an inlet for the fluidizing gas. The mixing zone is generally from about 4% to about 20% of the total reactor volume, preferably from about 10% to about 20% of the total reactor volume. While the exact dimensions of the mixing zone may vary, the mixing zone typically may have an internal diameter of from 0.1 to 3 meters, from 0.1 to 2 meters, from 0.15 meters to 1 meters, or from 0.15 to 0.6 meters. It is within the ability of one skilled in the art to determine a suitable dimension for the mixing zone, taking into consideration, for example, the number of cylindrical vessels utilized, along with other operating conditions, such as the superficial gas velocity of the fluidizing gas, the rate at which the biomass feedstock is fed into the mixing zone, the amount of catalyst and partial pressure of hydrogen within the reactor, the desired residence time of the catalyst and fluidizing gas in the mixing zone, and the desired residence time of the biomass, catalyst, and fluidizing gas, etc. It also within the ability of one skilled in the art to determine a suitable dimension for the mixing zone such that backmixing of biomass from a bulk reactor zone located above the mixing zone is negligible, taking into consideration, for example, the superficial gas velocity of the fluidizing gas.

Optionally, the mixing zone may further include one or more mixing devices. Suitably, any device that promotes axial and/or radial mixing within the mixing zone may be employed in the fluidized bed reactors of the present disclosure. One example of such a suitable mixing device includes a deflection ring positioned at the wall of the mixing zone.

Additionally, in certain embodiments, the mixing zone may further include one or more internals for heat exchange and/or one or more bubble breakers to prevent slug formation. Moreover, the mixing zone may optionally further include one or more gas and/or liquid (water, hydrocarbon) quenches that serve to reduce the temperature in the mixing zone.

In addition to the mixing zone, a fluidized bed reactor of the present disclosure further includes a bulk reactor zone. As used herein, the term "bulk reactor zone" is used to describe a region in a fluidized bed reactor positioned downstream (i.e. above) the mixing zone wherein hydropyrolysis of the biomass primarily occurs. The biomass is supplied to the bulk reactor zone from the mixing zone. In the bulk reactor zone, the biomass is contacted with the deoxygenating catalyst in the presence of the fluidizing gas under the desired hydropyrolysis conditions to produce a hydropyrolysis reactor output including at least one non-condensable gas, a partially deoxygenated hydropyrolysis product and char. Subsequently, at least a portion of the deoxygenating catalyst from the bulk reactor zone of the hydropyrolysis reactor is withdrawn via one or more downcomers to form the catalyst recirculation stream that is supplied to the mixing zone.

The bulk reactor zone is generally from about 80% to about 96% of the total reactor volume, preferably from about 80% to about 90% of the total reactor volume. It is within the ability of one skilled in the art to determine a suitable dimension for the bulk reactor zone, taking into consideration, for example, the dimensions of the mixing zone, along with other operating conditions, such as the superficial gas velocity of the fluidizing gas, the partial pressure of hydrogen within the reactor, the operating temperature, and the desired residence time of the biomass, and fluidizing gas, etc. It also within the ability of one skilled in the art to determine a suitable dimension for the bulk reactor zone such that backmixing of biomass from the bulk reactor zone to the mixing zone is negligible, taking into consideration, for example, operating conditions such as the superficial gas velocity of the fluidizing gas.

Optionally, the bulk reactor zone may further include one or more internals for heat exchange and/or one or more bubble breakers to prevent slug formation. Additionally, the bulk reactor zone may optionally further include one or more gas and/or liquid (water, hydrocarbon) quenches that serve to reduce the temperature in the bulk reactor zone.

As mentioned, the fluidized bed reactors of the present disclosure include one or more downcomers that fluidly connect the bulk reactor zone located at or near the top of the reactor to the mixing zone located at or near the bottom part of the reactor, so as to supply a catalyst recirculation stream from the bulk reactor zone to the mixing zone. Generally, the one or more downcomers allow for the downward flow of a catalyst recirculation stream from the bulk reactor zone to the mixing zone. In one embodiment, a downcomer may be an external pipe or alternatively, a downcomer may be present internally in the core of the fluidized bed reactor.

Fluidization in the mixing zone and bulk reactor zone of the fluidized bed reactor may be performed with a fluidizing gas having a superficial velocity effective for carrying out the type of fluidization desired (e.g., bubbling bed fluidization), considering the properties of the biomass feedstock, conditions within the reactor, and the particular fluidizing gas being used. In general, a fluidizing gas including hydrogen will have a superficial velocity of generally greater than about 0.1 meters per second (m/s) (e.g., from about 0.1 m/s to about 20 m/s), greater than 0.2 m/s (e.g. from about 0.2 m/s to about 2.4 m/s), typically greater than about 0.3 m/s (e.g., from about 0.3 m/s to about 1.5 m/s), and often greater than about 0.5 m/s (e.g., from about 0.5 m/s to about 1 m/s). Suitable fluidizing gas streams include primarily hydrogen, but may also contain other non-condensable gases (e.g. CO, $CO_2$, and/or $CH_4$).

Preferably, the superficial gas velocity of the fluidizing gas in the mixing zone is the same as or higher than that in the bulk reactor zone. Generally speaking, a higher superficial gas velocity in the mixing zone enables the use of larger biomass particles as compared to a standard fluidized bed as they do not sink to the bottom and form deposits. It is within the ability of one skilled in the art to select a suitable combination of superficial gas velocity, length of mixing zone and diameter of mixing zone, taking into consideration, for example, the rate at which the biomass feedstock is fed into the mixing zone, the amount of catalyst circulated and partial pressure of hydrogen within the reactor, the desired residence time of the biomass, catalyst, and fluidizing gas, etc. It also within the ability of one skilled in the art to determine a suitable combination of superficial gas velocity, length of mixing zone and diameter of mixing zone such that backmixing of biomass from a bulk reactor zone located above the mixing zone is negligible, taking into consideration, for example, the dimensions of the mixing zone and the bulk reactor zone.

Conditions in the fluidized bed reactor include a temperature generally from about 330° C. (626° F.) to about 500° C. (932° F.), typically from about 350° C. (662° F.) to about 480° C. (896° F.), more typically from about 370° C. (698° F.) to about 450° C. (824° F.). The exact operating temperature depends upon the composition of the feedstock that is to undergo hydropyrolysis, the characteristics of the deoxygenating catalyst, and the desired composition of products that is to be obtained. The pressure within the reactor is typically in the range of from 0.50 MPa to 7.50 MPa. The exact operating pressure of the fluidized bed reactor depends upon the composition of the feedstock that is to undergo hydropyrolysis, the choice of catalyst, the composition of the fluidizing gas (i.e. the hydrogen rich gas purity) and the desired composition of products that are to be obtained. The weight hourly space velocity (WHSV) in the reactor, calculated as the combined weight flow rate of the biomass feedstock, divided by the weight of the catalyst inventory in the reactor, is generally from about $0.1\ hr^{-1}$ to about $10\ hr^{-1}$, typically from about $0.5\ hr^{-1}$ to about $5\ hr^{-1}$, and often from about $0.8\ hr^{-1}$ to about $3\ hr^{-1}$. In general, the fluidization velocity, catalyst size and bulk density and feedstock size and bulk density are chosen such that the deoxygenation catalyst remains in the fluidized bed, while the char produced gets entrained out of the reactor.

Optionally, a fluidized bed reactor of the present disclosure may further include an expanded solids disengagement zone (i.e., a section of expanded reactor diameter or cross-sectional area, relative to the diameter or cross-sectional area of the fluidized bed) at a suitable height above the bulk reactor zone in order to promote the separation of solid char particles from solid catalyst particles. The expanded disengagement zone may have a reduced superficial gas velocity to promote the effective disengagement of relatively small diameter solid particles that would otherwise be elutriated at the higher superficial gas velocity through the bulk reactor zone. Other gas-solids separation devices (e.g., filters, cyclones, etc.) may be employed in place of, but preferably in combination with, the use of an expanded solids disengagement zone.

The hydropyrolysis processes of the present disclosure produce a hydropyrolysis reactor output including a partially deoxygenated hydropyrolysis product (e.g., in the form of a condensable vapor), at least one non-condensable gas (e.g., CO, $CO_2$, and/or $CH_4$), and char particles. As used herein, the "partially deoxygenated hydropyrolysis product" may include oxygenated hydrocarbons (e.g., derived from cellulose, hemicellulose, and/or lignin) that may be subjected to more complete deoxygenation (e.g., to produce hydrocarbons and remove the oxygen in the form of CO, $CO_2$, and/or water) in a subsequent (downstream) hydroconversion process. Representative oxygen contents of the partially deoxygenated hydropyrolysis product are generally in the range from about 1 to about 30% by weight, or from about 5 to about 25% by weight.

Char Removal

Following hydropyrolysis, representative processes may further include removing all or substantially all of the char particles and/or other solid particles (e.g., catalyst fines) from the hydropyrolysis reactor output to provide a purified hydropyrolysis reactor vapor stream having a reduced char content. The removal of char particles may be particularly important in processes in which the products of hydropyrolysis, including the purified hydropyrolysis product vapor stream or a portion thereof, are subjected to a fixed bed catalytic conversion process. In such cases, the removal of fine char particles prevents problems associated with premature plugging of the fixed bed as the char particles become trapped within the voids of the fixed catalyst bed. As defined herein, the removal of substantially all of the char particles means that at least 99% by weight of the char particles in the hydropyrolysis reactor output are excluded from the purified hydropyrolysis product vapor stream. According to further embodiments, at 99.9% by weight, or at least 99.99% by weight, of the char particles are excluded.

The method of char and catalyst fines removal is generally not limited, and may include any method suitable for use with the hydropyrolysis processes of the present disclosure. A preferred method of char and catalyst fines removal from the vapor stream is by cyclone separation. Other examples of suitable char removal include those described in U.S. Pat. No. 10,822,546, the relevant disclosure of which is hereby incorporated by reference.

Hydroconversion Reactor

In further embodiments, processes of the present disclosure may optionally further include hydroconverting at least a portion of the partially deoxygenated hydropyrolysis product or purified hydropyrolysis reactor vapor stream in a hydroconversion reactor vessel including a hydroconversion catalyst (e.g., as a fixed bed). A hydroconversion reactor output is produced, from which a substantially fully deoxygenated hydrocarbon liquid and a gaseous mixture may be recovered. Suitable hydroconversion catalyst compositions include catalysts suitable for hydrodeoxygenation and aromatic saturation. This step may suitably be carried out at a temperature in the range of from 150° C. to 400° C. and a pressure in the range of from to 7.50 MPa. The weight hourly space velocity (WHSV) for this step is in the range of about $0.1\ h^{-1}$ to about $2\ h^{-1}$.

Conditions in the hydroconversion reactor include a temperature generally from about 200° C. (392° F.) to about 475° C. (887° F.), typically from about 260° C. (500° F.) to about 450° C. (842° F.), and often from about 315° C. (599° F.) to about 430° C. (806° F.). The weight hourly space velocity (WHSV) of the hydroconversion reactor, calculated as the total weight flow rate of the feed, to the hydroconversion reactor (e.g., a purified vapor stream obtained from the hydropyrolysis reactor, following the removal of char particles) divided by the weight of the catalyst inventory of the hydroconversion reactor, is generally from about $0.01\ hr^{-1}$ to about $5\ hr^{-1}$, typically from about $0.05\ hr^{-1}$ to about $5\ hr^{-1}$, and often from about $hr^{-1}$ to about $4\ hr^{-1}$.

Biomass Feedstock

The biomass feedstock used in the present disclosure contains any combination of biomass-containing and/or biomass-derived feedstock.

As used herein, the term "biomass" generally refers to substances derived from organisms living above the earth's surface or within the earth's oceans, rivers, and/or lakes. Representative biomass can include any plant material, or mixture of plant materials, such as a hardwood (e.g., whitewood), a softwood, a hardwood or softwood bark, lignin, algae, and/or lemna (sea weeds). Energy crops, or otherwise agricultural residues (e.g., logging residues) or other types of plant wastes or plant-derived wastes, may also be used as plant materials. Specific exemplary plant materials include corn fiber, corn stover, and sugar cane bagasse, in addition to "on-purpose" energy crops such as switchgrass, miscanthus, and algae. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include vegetable oils, carbohydrates (e.g., sugars), organic waste materials, such as waste paper, construction, demolition wastes, and biosludge.

A "biomass-containing" feedstock may include all or substantially all biomass, but may also contain non-biological materials (e.g., materials derived from petroleum, such as plastics, or materials derived from minerals extracted from the earth, such as metals and metal oxides, including glass) in significant quantities (e.g., at least about 5% by weight, such as from about 5% to about 55% by weight, or at least about 25% by weight, such as from about 25% to about 45% by weight). An example of a "biomass-containing" feedstock that may include one or more non-biological materials is municipal solid waste (MSW).

"Biomass-derived," for example when used in the phrase "biomass-derived feedstock," refers to products resulting or obtained from the thermal and/or chemical transformation of biomass, as defined above, or biomass-containing feedstocks (e.g., MSW). Representative biomass-derived feedstocks therefore include, but are not limited to, products of pyrolysis (e.g., bio-oils), torrefaction (e.g., torrefied and optionally densified wood), hydrothermal carbonization (e.g., biomass that is pretreated and densified by acid hydrolysis in hot, compressed water), and polymerization (e.g., organic polymers derived from plant monomers). Other specific examples of biomass-derived products (e.g., for use as feedstocks) include black liquor, pure lignin, and lignin sulfonate. Biomass-derived feedstocks also extend to pretreated feedstocks that result or are obtained from thermal and/or chemical transformation, prior to, or upstream of, their use as feedstocks for a given conversion step (e.g., hydropyrolysis). Other examples of suitable biomass feedstocks include those described in U.S. Pat. No. 10,822,546, the relevant disclosure of which is hereby incorporated by reference.

The biomass feedstock may be used in a dry form, for example, after being subjected to a drying step sufficient to reduce the moisture content of the initial feedstock to less than about 1% by weight, or even less than about 0.1% by weight). According to other embodiments, the biomass feedstock may include moisture (e.g., have a moisture content of greater than about 1%, such as from about 1% to about 10% by weight). In still other embodiments, the biomass feedstock may be used in the form of an aqueous slurry.

The rate at which the biomass feedstock is fed into the mixing zone of the fluidized bed reactor depends upon, inter alia, the amount of catalyst and partial pressure of hydrogen within the reactor. The relationship between the rate at which feedstock is sent into the bed, and the amount of catalyst present in the bed, can be quantified in terms of a volume hourly space velocity (VHSV). The VHSV can be calculated by dividing the volumetric flow per hour of feedstock sent into the reactor by the bulk volume of the catalyst present in the bed, in the absence of any fluidizing gas flow. In accordance with the hydropyrolysis processes of the present disclosure, the reactor can be operated over a catalyst VHSV range of 0.3 $hr^{-1}$ to 45 $hr^{-1}$. The exact catalyst VHSV that is appropriate for a given combination of feedstock and catalyst depends on the nature of the feedstock and catalyst, and on the desired composition of the products that are to be obtained. The atmosphere in the reactor should consist largely of hydrogen (though other inert gases, like $CO_2$, may also be present), and the feedstock flow rate cannot be so great that the vapor-phase products of feedstock decomposition dilute the hydrogen atmosphere to a point where the required partial pressure of hydrogen needed to carry out the desired set of reactions is no longer available.

Deoxygenation Catalyst

Deoxygenation catalyst suitable for use herein generally include one or more active metals selected from cobalt, molybdenum, nickel, tungsten, ruthenium, platinum, palladium, iridium and iron. Preferably, the one or more active metals are selected from cobalt, molybdenum, nickel and tungsten.

The metals present in the deoxygenation catalyst are supported, preferably on a metal oxide support. Metal oxides useful as supports for the deoxygenation catalyst include alumina, silica, titania, ceria, zirconia, as well as binary oxides such as silica-alumina, silica-titania and ceria-zirconia. Preferred supports include alumina, silica and titania. The support may optionally contain recycled, regenerated and revitalised fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the deoxygenation catalyst are preferably in the range of from 0.05 wt % to 3 wt % for noble metals (e.g. ruthenium, platinum, palladium and iridium) and from 1 wt % to 75 wt % for base metals (e.g. cobalt, molybdenum, nickel, tungsten and iron) (weight percentages are expressed as a weight percentage of total of all active metals on the calcined catalyst in their reduced (metallic) form).

Additional elements such as one or more of phosphorous, boron and nickel may be incorporated into the catalyst to improve the dispersion of the active metal.

The deoxygenation catalyst may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

The deoxygenation catalyst is preferably present in the form of spherical catalyst particles. Catalyst particles sizes, for use in a commercial reactor in the hydropyrolysis step, are preferably in the range of from mm to 4.0 mm, more preferably in the range of from 0.6 mm to 3.0 mm, and most preferably in the range of from 1 mm to 2.4 mm.

Figure 1:
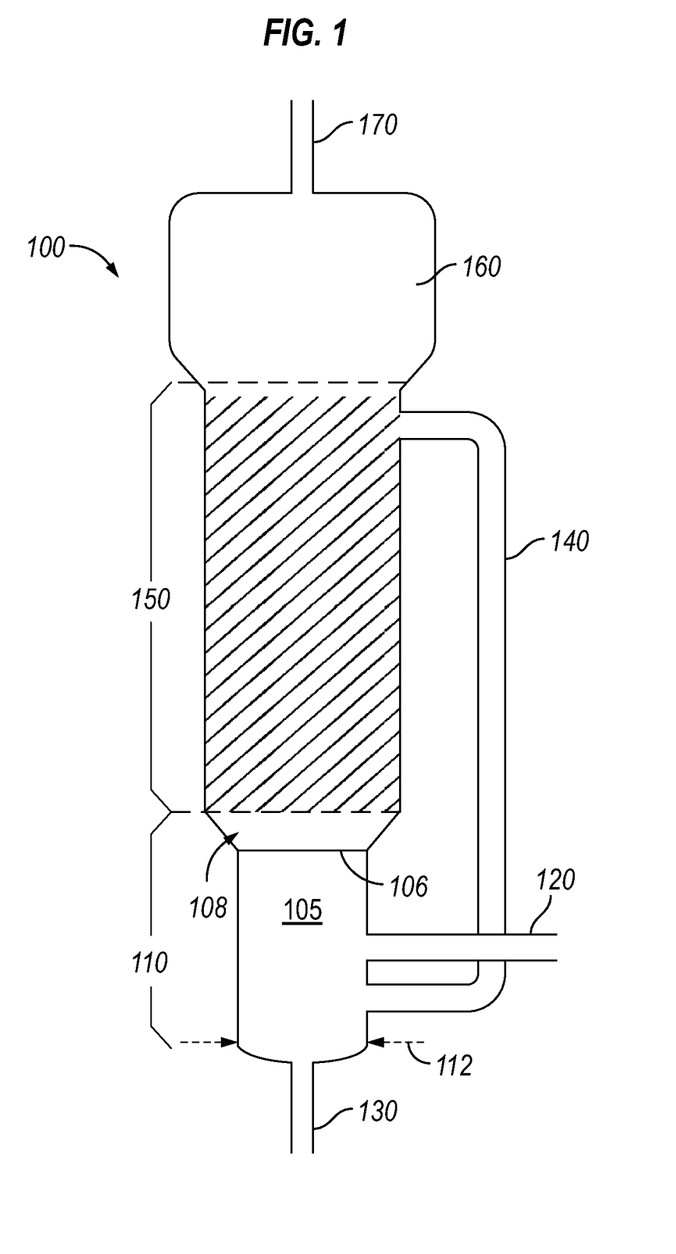
FIG. 1 is a schematic flow diagram in accordance with an embodiment of the present disclosure.

Reference is now made to FIG. 1, which is a schematic diagram according to one possible, non-limiting embodiment of the process described in the present disclosure. As illustrated, fluidized bed reactor 100 includes mixing zone 110, bulk reactor zone 150 and expanded solids disengagement zone 160. Mixing zone 110 includes one cylindrical vessel 105. As illustrated, the cylindrical vessel 105 includes an outlet 106 having a first diameter 108 that is wider than a second diameter 112 of the vessel 105. The first diameter 108 of the outlet 106 varies such that it increases in the direction of flow into the bulk reactor zone 150. That is, the outlet 106 is has a taper. Therefore, as the fluids within the mixing zone 110 exit the cylindrical vessel 105, the flow expands prior to entering the bulk reactor zone 150. The second diameter of the cylindrical vessel 105 is smaller than the diameter of the bulk reactor zone vessel. For example, in certain embodiments, the second diameter of the cylindrical vessel 105 is approximately one and a half times smaller than the diameter of the bulk reactor zone vessel. Biomass feedstock 120 is supplied to cylindrical vessel 105 in mixing zone 110 of reactor 100 via one or more inlets. Although not depicted in FIG. 1, biomass feedstock 120 may be supplied to cylindrical vessel 105 via more than one inlet location, which can be at different axial heights. Fluidizing gas stream 130 is supplied to fluidized bed reactor 100 via one or more inlets at or near the bottom of reactor 100 and may serve to entrain any solid particles present in catalyst recirculation stream 140. Catalyst recirculation stream 140 is withdrawn from reactor 100 via one or more outlets in bulk reactor zone 150 and supplied to mixing zone 110 of hydropyrolysis reactor 100 via one or more inlets. While in the illustrated embodiment, the one or more inlets that supply the catalyst recirculation stream 140 to the mixing zone 110 are positioned on a side of the cylindrical vessel 105, the one or more inlets may be near the bottom. For example, the one or more inlets may feed the catalyst recirculation stream 140 into a conduit having the fluidizing gas stream 130 such that the catalyst recirculation stream 140 and the fluidizing gas stream 130 are mixed prior to being fed to the mixing zone 110. In mixing zone 110, the recirculated stream 140 is thermally equilibrated with the fluidizing gas 130 (e.g., hydrogen) by contacting the recirculated stream 140 with the fluidizing gas 130 Following thermal equilibrium of the recirculated stream 140, the biomass feedstock is supplied to the mixing zone 110. As should be appreciated, in certain embodiments, a portion of the deoxygenating catalyst within the mixing zone 110 may be fresh catalyst and/or catalyst that is not provided from the bulk zone.

Existing techniques heat and mix the biomass feedstock with other fluids (e.g., fluidizing gas) prior to providing it to the reactor, which results in non-uniform heating of the biomass feedstock and plugging of inlets. It has been recognized that by providing the recirculated stream 140 at a location upstream from (e.g., below) the inlet of the biomass feedstock, it forces the biomass feedstock into intimate contact with the upflowing heat source (e.g., the mixture of the recirculated stream 140 and fluidizing gas 130). As a consequence, the biomass feedstock, which needs to be feed into the mixing zone at a temperature between ambient and approximately 100° C. to avoid plugging the inlet, is rapidly heated to pyrolysis temperature (e.g., a temperature above approximately 340° C.) within the mixing zone, thereby maximizing yield of C4+ liquid hydrocarbons in the reactor. Additionally, this arrangement allows thermal equilibration of the fluidizing gas 130 with the recirculated stream 140 before it comes into contact with the biomass feedstock to facilitate rapid heating of the biomass feedstock.

The mixture of the biomass feedstock, the recirculated stream 140 and the fluidizing gas 130 is subsequently supplied to bulk reactor zone 150. In bulk reactor zone 150, the biomass feedstock undergoes hydropyrolysis in the presence of the deoxygenating catalyst so to produce a hydropyrolysis reactor output including at least one non-condensable gas, a partially deoxygenated hydropyrolysis product and char, which is removed as hydropyrolysis reactor output stream 170 via one or more outlets.

Figure 2A:
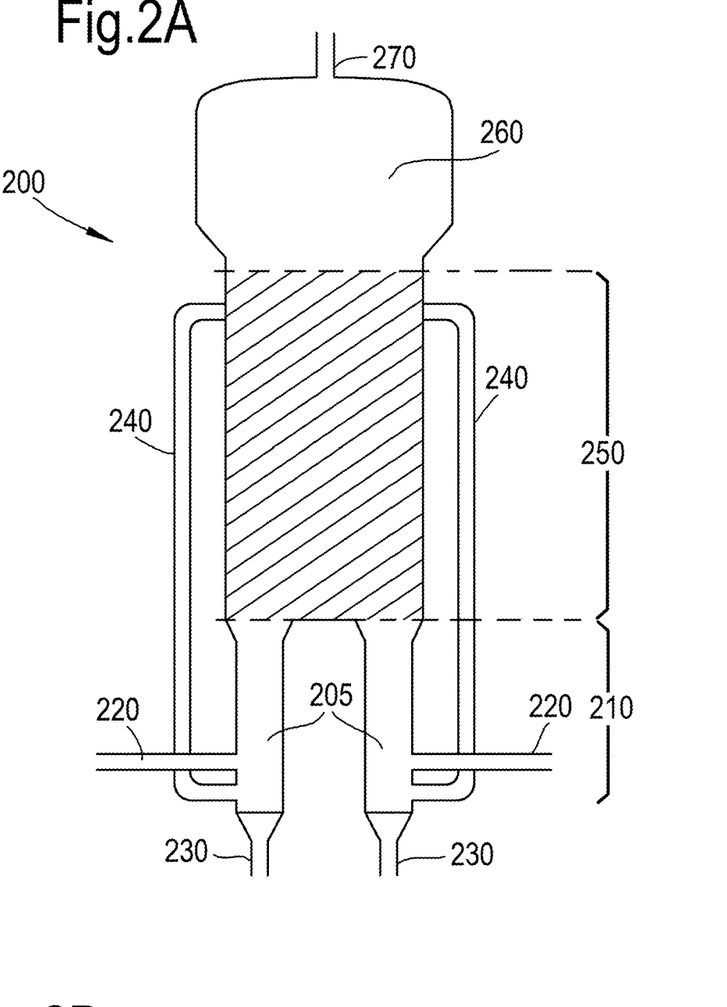
FIG. 2A is a schematic diagram showing an exemplary, but non-limiting embodiment of a fluidized bed reactor of the present disclosure.
Figure 2B:
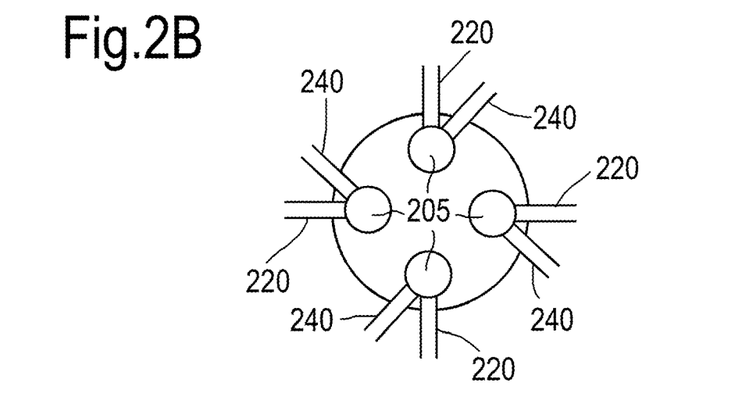
FIG. 2B is a top down view of the mixing zone shown in FIG. 2A.

Reference is now made to FIG. 2A, which is a schematic diagram showing an exemplary, but non-limiting embodiment of a fluidized bed reactor of the present disclosure. As illustrated, fluidized bed reactor 200 includes mixing zone 210, bulk reactor zone 250, and expanded solids disengagement zone 260. Mixing zone 210 includes cylindrical vessels 205. Biomass feedstock 220 is supplied to cylindrical vessels 205 in mixing zone 210 of reactor 200 via more than one inlet. Although not depicted in FIG. 2A, biomass feedstock 220 may be supplied to cylindrical vessels 205 via multiple inlets at different axial heights. Fluidizing gas stream 230 is supplied to fluidized bed reactor 100 via more than one inlet at or near the bottom of reactor 200. Catalyst recirculation stream 240 is withdrawn from reactor 200 via more than one outlet in bulk reactor zone 250 and supplied to mixing zone 210 of hydropyrolysis reactor 200 via one or more inlets. In mixing zone 210, biomass feedstock, fluidizing gas and deoxygenating catalyst, which is at least partially supplied from catalyst recirculation stream 240, are mixed and subsequently supplied to bulk reactor zone 250. In bulk reactor zone 250, the biomass feedstock undergoes hydropyrolysis in the presence of the deoxygenating catalyst so to produce a hydropyrolysis reactor output including at least one non-condensable gas, a partially deoxygenated hydropyrolysis product and char, which is removed as hydropyrolysis reactor output stream 270 from reactor 200 via one or more outlets. FIG. 2B is a top down view of the mixing zone shown in FIG. 2A.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. A process comprising:
   (a) a supplying a biomass feedstock, a fluidizing gas comprising hydrogen, and a catalyst recirculation stream comprising deoxygenating catalyst to a mixing zone of a fluidized bed reactor, wherein the mixing zone comprises a feedstock inlet at a first location and a catalyst recirculation inlet at a second location, and wherein the second location is upstream of the first location such that the catalyst recirculation stream is supplied to the mixing zone below the biomass feedstock;
   (b) allowing the biomass feedstock, the fluidizing gas and the deoxygenating catalyst to move upwards through the fluidized bed reactor from the mixing zone to a bulk reactor zone;
   (c) allowing the biomass feedstock to contact the deoxygenating catalyst in the presence of the fluidizing gas in the bulk reactor zone of the fluidized bed reactor to produce a hydropyrolysis reactor output comprising at least one non-condensable gas, a partially deoxygenated hydropyrolysis product and char; and
   (d) withdrawing at least a portion of the deoxygenating catalyst from the bulk reactor zone to form the catalyst recirculation stream that is supplied to the mixing zone in step a).

2. Process of claim 1, wherein the biomass feedstock comprises municipal solid waste.

3. Process of claim 1, wherein the biomass feedstock comprises lignocellulosic materials.

4. Process of claim 1, wherein the biomass feedstock contacts the deoxygenating catalyst in the bulk reactor zone at a temperature in the range of from 330° C. to about 500° C., preferably in the range of from about 350° C. to about 480° C.

5. Process of claim 1, wherein the biomass feedstock contacts the deoxygenating catalyst in the bulk reactor zone at a pressure in the range of from 0.50 MPa to 7.50Mpa.

6. Process of claim 1, wherein a superficial velocity of the fluidizing gas passing through the fluidized bed reactor is sufficient to create a state consistent with that of a bubbling fluidized bed.

7. Process of claim 1, wherein a superficial velocity of the fluidizing gas passing through the fluidized bed reactor is from about 0.1 m/s to about 20 m/s, preferably from 0.2 to 2.4 m/s.

8. Process of claim 1, wherein the mixing zone comprises more than one cylindrical vessel.

9. Process of claim 1, wherein the mixing zone is from about 4% to about 20% of the total reactor volume, preferably from about 10% to about 20% of the total reactor volume.

10. Process of aim 1, wherein the bulk reactor zone is from about 80% to about 96% of the total reactor volume, preferably from about 80% to about 90% of the total reactor volume.

11. Process of claim 1, wherein the biomass feedstock is supplied to the mixing zone via more than one inlet location at different axial heights.

12. Process of claim 1, further comprising:
(e) removing substantially all char from the hydropyrolysis reactor output to provide a purified hydropyrolysis reactor vapor stream;
(f) hydroconverting at least a portion of the purified hydropyrolysis reactor vapor stream in a hydroconversion reactor comprising a hydroconversion catalyst to produce a hydroconversion reactor output; and
(g) recovering a substantially fully deoxygenated hydrocarbon liquid and a gaseous mixture from the hydroconversion reactor output.

13. A fluidized bed reactor comprising:
a mixing zone, a bulk reactor zone, one or more downcomers fluidly connecting the mixing zone and the bulk reactor zone, and an outlet at the top of the fluidized bed reactor configured to produce a hydropyrolysis reactor output comprising at least one non-condensable gas, a partially deoxygenated hydropyrolysis product and char,
wherein the mixing zone comprises: one or more inlets positioned at a first location and fluidly connected to a source of a biomass feedstock; one or more inlets at a second location different from the first location and fluidly connected to a source of a fluidizing gas; and one or more inlets at a third location different from the first and second locations and defining one or more outlets of the one or more downcomers, wherein the one or more inlets are fluidly connecting the mixing zone and the bulk reactor zone, wherein the third location is upstream of the first location such that the third location is below the first location, and wherein the bulk reactor zone is positioned above the mixing zone.

14. Reactor of claim 13, wherein the mixing zone comprises more than one cylindrical vessel.

15. Reactor of claim 13, wherein each of the more than one cylindrical vessels in the mixing zone comprise one or more inlets that are fluidly connected to a source of a biomass feedstock; one or more inlets that are fluidly connected to a source of a fluidizing gas; and one or more inlets for one or more outlets of the one or more downcomers fluidly connecting the mixing zone and the bulk reactor zone.

16. Reactor of claim 13, wherein the mixing zone is from about 4% to about 20% of the total reactor volume, preferably from about 10% to about 20% of the total reactor volume.

17. Reactor of claim 13, wherein the bulk reactor zone is from about 80% to about 96% of the total reactor volume, preferably from about 80% to about 90% of the total reactor volume.

* * * * *